(12) United States Patent
Ince et al.

(10) Patent No.: US 10,107,334 B2
(45) Date of Patent: Oct. 23, 2018

(54) RIBBON CAGE AND ROLLER ASSEMBLY AND METHOD THEREOF

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/357,104

(22) Filed: Nov. 21, 2016

(65) Prior Publication Data
US 2018/0142732 A1 May 24, 2018

(51) Int. Cl.
| | | |
|---|---|---|
| F16C 33/54 | (2006.01) | |
| F16C 33/49 | (2006.01) | |
| F16C 19/26 | (2006.01) | |
| F16C 33/46 | (2006.01) | |

(52) U.S. Cl.
CPC .............. *F16C 33/49* (2013.01); *F16C 19/26* (2013.01); *F16C 33/4682* (2013.01); *F16C 2220/42* (2013.01); *F16C 2226/52* (2013.01); *F16C 2361/61* (2013.01)

(58) Field of Classification Search
CPC ....... F16C 33/54–33/543; F16C 33/547; F16C 33/548; B21D 53/12
USPC ........................................ 384/575, 579, 578
See application file for complete search history.

(56) References Cited

U.S. PATENT DOCUMENTS

| | | | | |
|---|---|---|---|---|
| 612,472 | A * | 10/1898 | Woodcock | F16C 33/46 384/575 |
| 887,356 | A * | 5/1908 | Straub | F16C 33/425 384/532 |
| 995,471 | A * | 6/1911 | Lockwood | F16C 19/385 384/571 |
| 1,598,025 | A | 3/1924 | Stevens | |
| 1,609,618 | A * | 12/1926 | Gallagher et al. | F16C 33/548 384/578 |
| 1,894,595 | A | 8/1929 | Mitchel | |
| 1,752,616 | A * | 4/1930 | Ryan | F16C 33/548 384/578 |
| 2,383,233 | A * | 8/1945 | Baker | F16C 33/54 384/573 |
| 3,438,685 | A * | 4/1969 | Anton | F16C 33/543 384/575 |
| 3,729,239 | A * | 4/1973 | Camosso | F16C 19/44 384/575 |
| 6,179,474 | B1 | 1/2001 | Podhajecki | |

(Continued)

FOREIGN PATENT DOCUMENTS

| | | | | |
|---|---|---|---|---|
| DE | 585099 | C * | 9/1933 | F16C 33/548 |
| DE | 3603413 | A1 * | 8/1987 | F16C 33/543 |

(Continued)

*Primary Examiner* — Thomas R Hannon

(57) ABSTRACT

A roller bearing cage, including: an axis of rotation; a body including a plurality of bars, each bar having a length, in a first axial direction parallel to the axis of rotation, a height, in a radial direction orthogonal to the axis of rotation, less than the length and a width, in a circumferential direction, less than the height; and a plurality of spaces, each space circumferentially disposed between a respective pair of circumferentially adjacent bars and arranged to receive a respective roller.

16 Claims, 16 Drawing Sheets

(56) References Cited

U.S. PATENT DOCUMENTS

| | | |
|---|---|---|
| 6,330,748 B1 | 12/2001 | Muentnich |
| 7,390,127 B2 * | 6/2008 | Kono ................. F16C 33/4611 |
| | | 384/526 |
| 2002/0061049 A1 | 6/2002 | Buard et al. |
| 2012/0063713 A1 | 3/2012 | Beuerlein |
| 2016/0003298 A1 * | 1/2016 | Masuch ................. F16C 33/50 |
| | | 384/573 |

FOREIGN PATENT DOCUMENTS

| | | |
|---|---|---|
| KR | 1020140076854 A | 6/2014 |
| WO | 2015091725 A1 | 6/2015 |

* cited by examiner

RIBBON CAGE AND ROLLER ASSEMBLY AND METHOD THEREOF

TECHNICAL FIELD

The present disclosure relates to a roller bearing cage with bars, circumferentially located between spaces arranged to receive rollers, having a circumferential extent less than a radial extent. The present disclosure also relates to a roller bearing assembly including rollers disposed in a roller bearing cage with bars, circumferentially between spaces arranged to receive rollers, having a circumferential extent less than a radial extent. The present disclosure further relates to a method of fabricating a roller bearing cage with bars, circumferentially between spaces arranged to receive rollers, having a circumferential extent less than a radial extent, and of fabricating a roller bearing assembly including the cage.

BACKGROUND

Planetary gear bearings for a transmission typically have a relatively small diameter envelope. Therefore, the diameter of the bearings and number of rollers in the bearings are limited, especially when a cage is used to retain and separate the rollers. A planetary gear bearing must employ a cage to reduce roller friction in high speed applications. The size and number of rollers in a planetary gear bearing determine the load carrying capacity of the bearing. However, known configurations of the cage bars that separate rollers in the cage take-up excessive circumferential space, limiting the size and number of rollers that can be placed in the cage. As a result, the loading bearing capacity of a known planetary gear bearing is similarly limited.

The torque requirements in modern transmissions are steadily increasing. However, attaining sufficient load bearing capacity in a planetary gear bearing is at times not achievable due to the limitations, noted above, on the number and size of rollers that can be placed in a known cage for a planetary gear bearings.

FIG. 19 is a perspective view of flat steel strip 300 in an initial stage for a prior art roller bearing cage. FIG. 20 is a perspective view of strip 300 in FIG. 19 after slots have been punched out to form pockets. FIG. 21 is a perspective view of a prior art roller bearing cage formed from the steel strip shown in FIGS. 19 and 20. FIGS. 19 through 21 are taken from FIGS. 1 through 3, respectively of commonly-owned U.S. Pat. No. 6,330,748. FIGS. 19 through 21 illustrate a known method of fabricating a cage, for example, for a planetary gear bearing. FIG. 19 shows strip 300 of steel, having a thickness 302. In FIG. 20, slots 304 have been punched out of strip 300 to form pockets for roller bearings. Bars 306 are formed between openings 304. Thickness 308 of bars 306 is equal to thickness 302 of strip 300. Dimension 310 of bars 306, between openings 304, is considerably greater than thicknesses 302 and 308.

In FIG. 21, strip 300 from FIG. 20 has been wrapped to form cage 312. Ends E1 and E2 of strip 300 are joined to form cage 312. Rollers (not shown) are placed in slots 304. Radial dimension 314 of bars 306 is equal to thicknesses 302 and 308. Circumferential dimension 316 of bars 306 is considerably greater than dimension 314. The extent of dimension 316 limits the number and size of rollers usable with cage 308. U.S. Pat. Nos. 1,598,025 and 1,894,595 also illustrate bearing cages having bars between spaces with circumferential dimensions considerably greater than radial dimensions.

It is not possible to successfully increase the number of rollers in a bearing cage using known production methods. For example, reducing the circumferential extent of the bars to accommodate more rollers drastically reduces cage robustness, which typically leads to premature failure.

SUMMARY

According to aspects illustrated herein, there is provided a roller bearing cage, including: an axis of rotation; a body including a plurality of bars, each bar having a length, in a first axial direction parallel to the axis of rotation, a height, in a radial direction orthogonal to the axis of rotation, less than the length and a width, in a circumferential direction, less than the height; and a plurality of spaces, each space circumferentially disposed between a respective pair of circumferentially adjacent bars and arranged to receive a respective roller.

According to aspects illustrated herein, there is provided a roller bearing assembly, including: an axis of rotation; a cage including a body including a plurality of bars and a plurality of end panels, each end panel directly connected to a respective pair of bars adjacent to each other in a circumferential direction; and a plurality of rollers, each roller in the plurality of rollers including an axis of rotation and disposed, in the circumferential direction, between a respective pair of bars. A line, co-linear with the axis of rotation of a first roller, passes through only one single end panel.

According to aspects illustrated herein, there is provided A method of fabricating a roller bearing cage, including: bending a strip of metal to form a plurality of bars and a plurality of end panels, the strip of metal having first and second oppositely facing sides, each of the first and second sides including a length in a first direction and a width, less than the length, in a second direction orthogonal to the first direction and a thickness, less than the width, in a third direction, orthogonal to the first and second directions, between the first and second oppositely facing sides; forming the strip of metal about an axis of rotation; forming a first end plate having a plurality of retention tabs and a plurality of pocket tabs; forming a second end plate having a plurality of retention tabs and a plurality of pockets tabs; fixedly securing the first end plate to a first group of end panels included in the plurality of end panels, such that the axis of rotation passes through the first end plate; fixedly securing the second end plate to a second group of end panels included in the plurality of end panels, such that the plurality of bars are disposed parallel to the axis of rotation and between the first and second end plates; forming a plurality of spaces bounded in a first axial direction, parallel to the axis of rotation, by the first end panel, bounded in a second axial direction, opposite the first axial direction, by the first group of end panels, and bounded in first and second opposite circumferential directions by the plurality of bars, or bounded in a first axial direction, parallel to the axis of rotation, by the second group of end panels, bounded in a second axial direction, opposite the first axial direction, by the second end panel, and bounded in first and second opposite circumferential directions by the plurality of bars.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
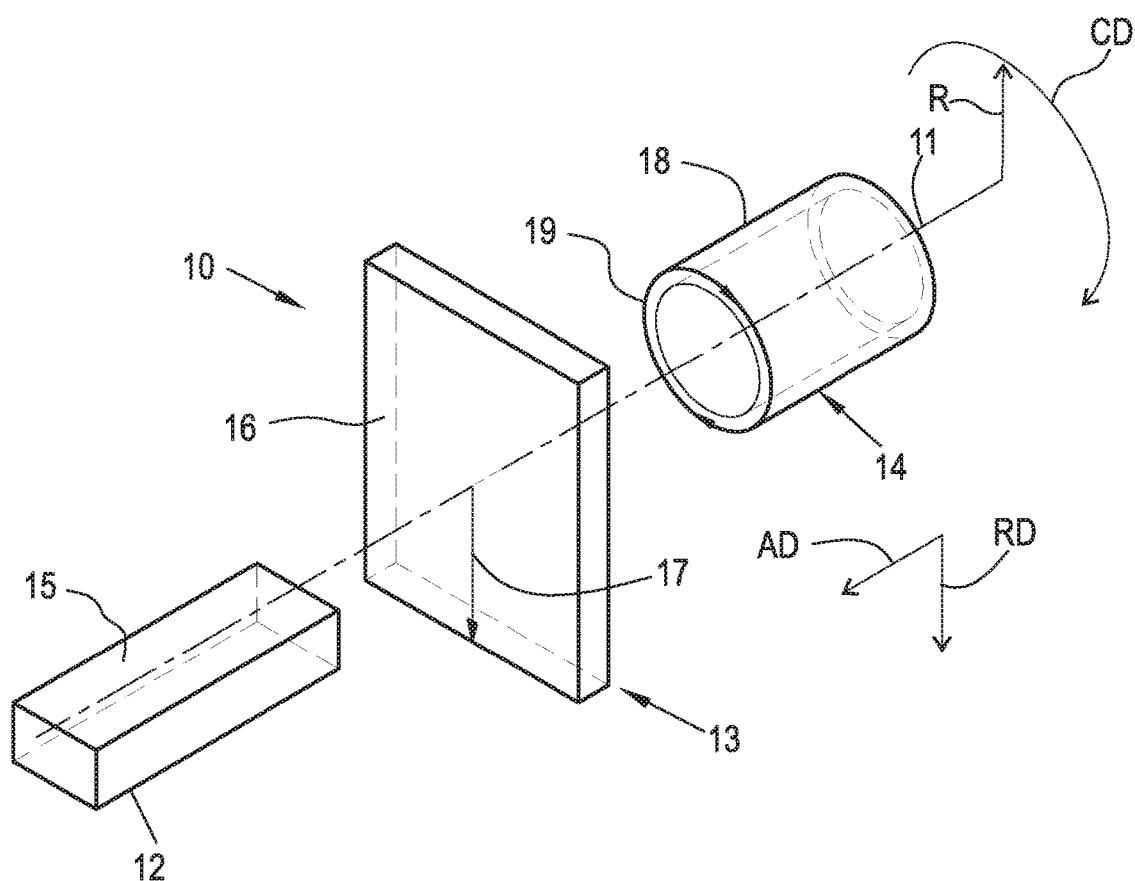
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
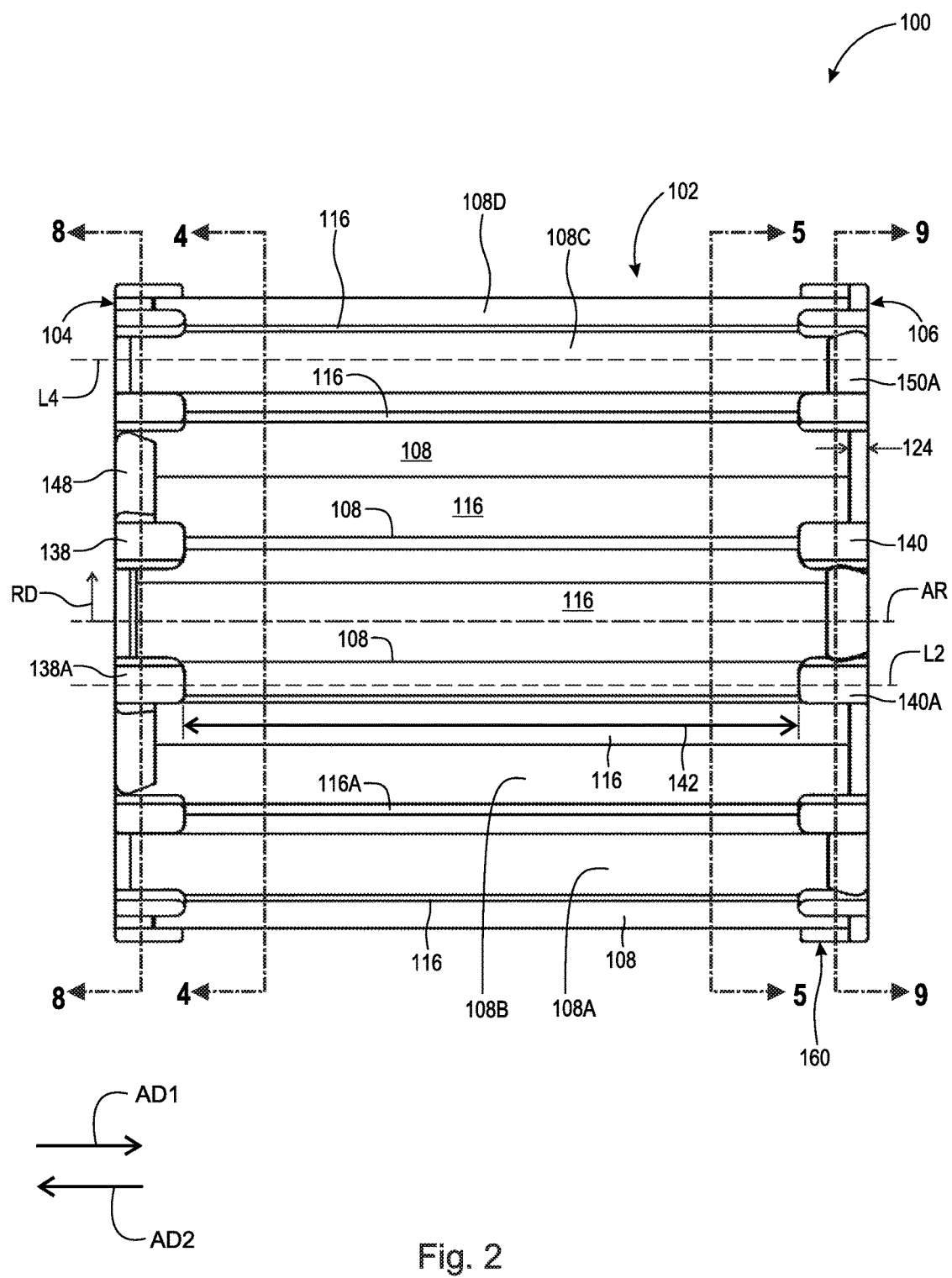
FIG. 2 is a side view of a roller bearing cage with bars having a circumferential extent less than a radial extent.

FIG. 2 is a side view of roller bearing cage 100 with bars having a circumferential extent less than a radial extent.

Figure 3:
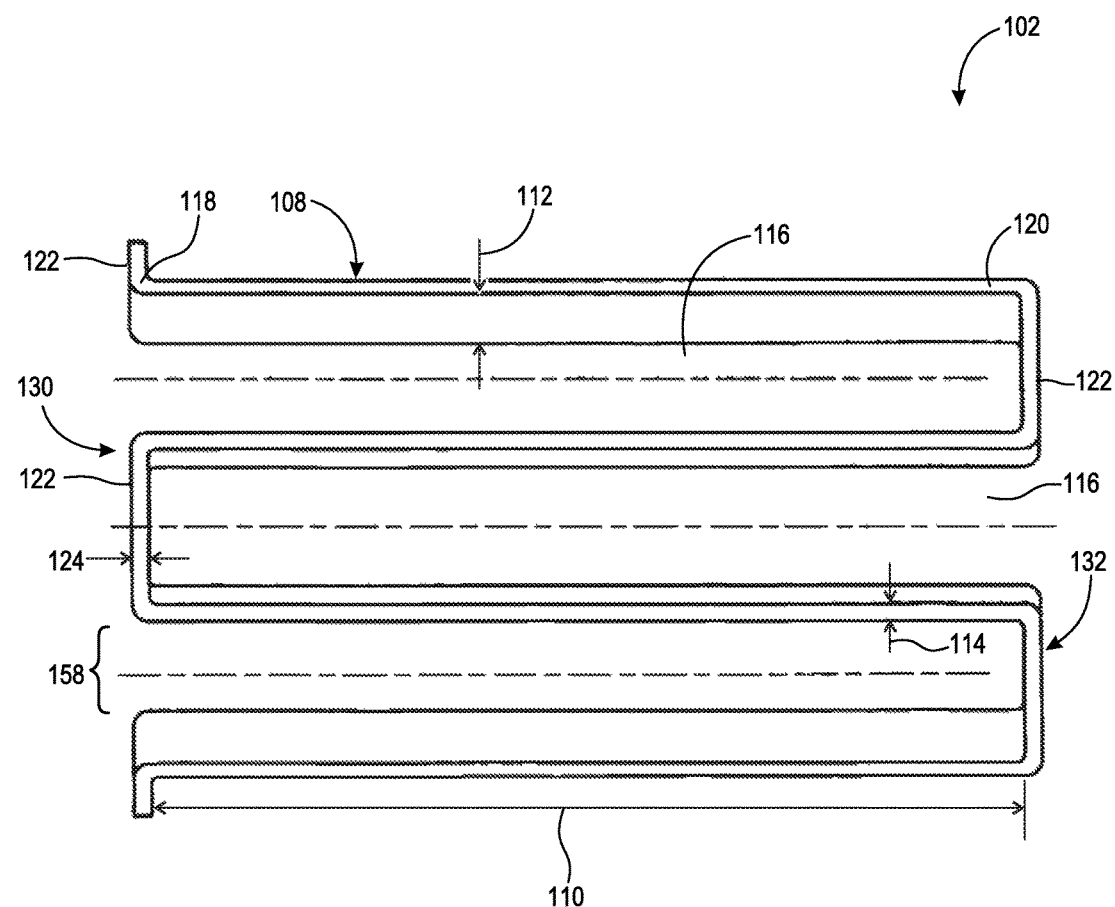
FIG. 3 is a side view of a portion of a body for the roller bearing cage in FIG. 2.

FIG. 3 is a side view of a portion of body 102 for roller bearing cage 100 in FIG. 2. The following should be viewed in light of FIGS. 2 and 3. Cage 100 includes axis of rotation AR, body 102, end plate 104 and end plate 106. Body 102 includes bars 108. Each bar 108 has: length 110 in axial direction AD1, parallel to axis of rotation AR; and height 112 in radial direction RD, orthogonal to axis of rotation AR. Height 112 is less than length 110. Body 102 is made of a single piece of material joined at end E1 and E2 (shown in FIG. 14 below).

Figure 4:
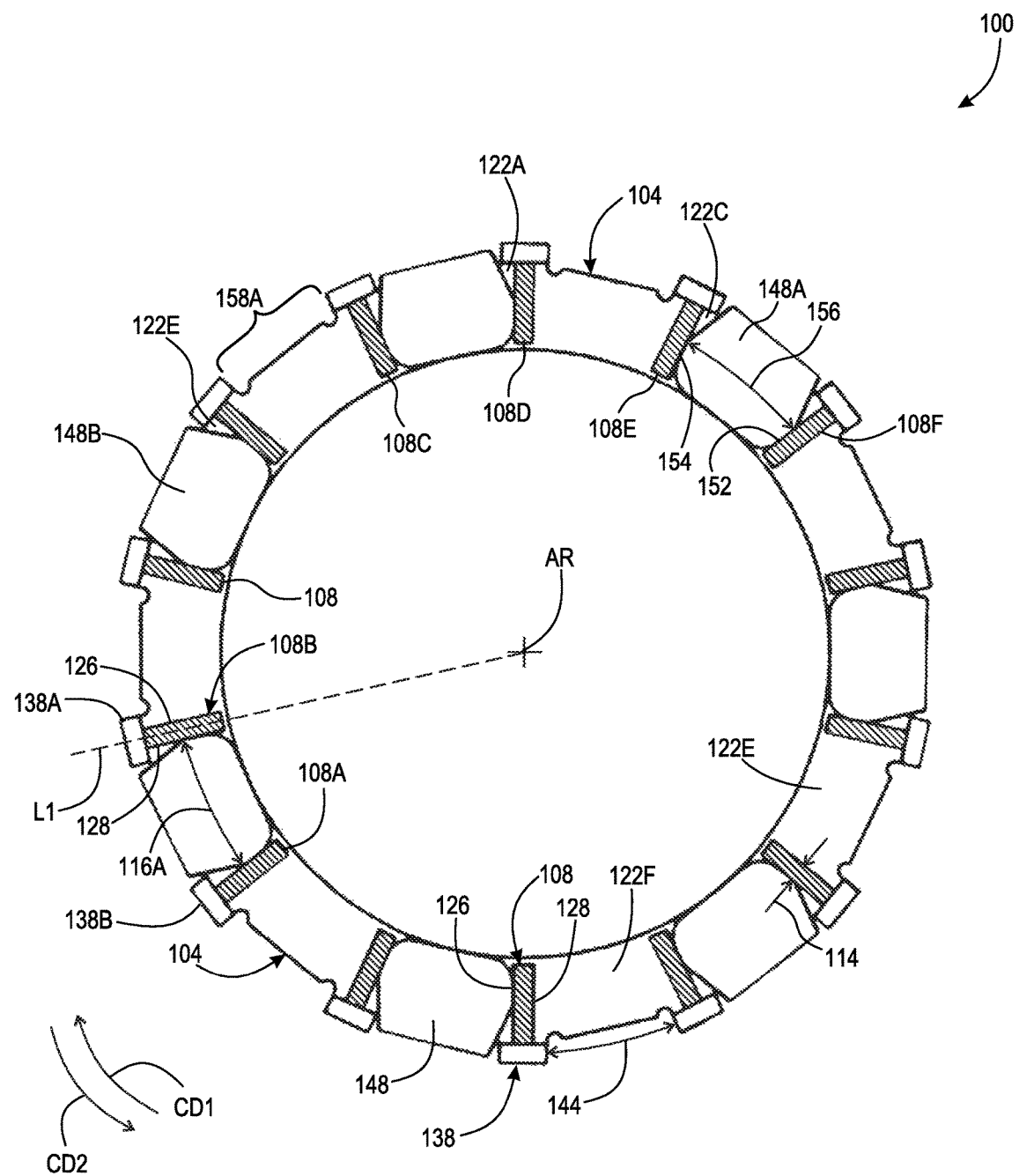
FIG. 4 is a cross-sectional view generally along line 4-4 in FIG. 2.

FIG. 4 is a cross-sectional view generally along line 4-4 in FIG. 2.

Figure 5:
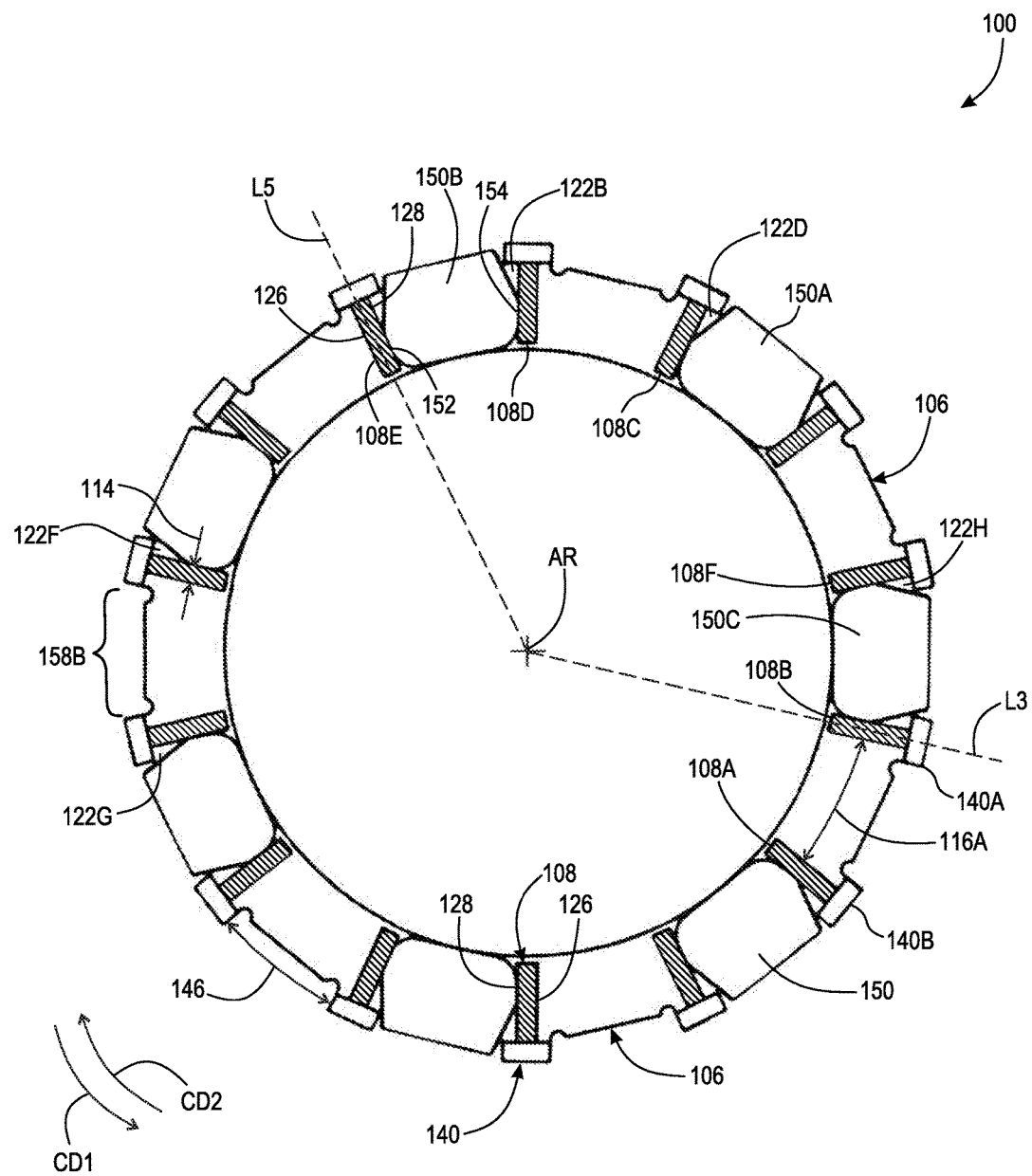
FIG. 5 is a cross-sectional view generally along line 5-5 in FIG. 2.
Figure 10:
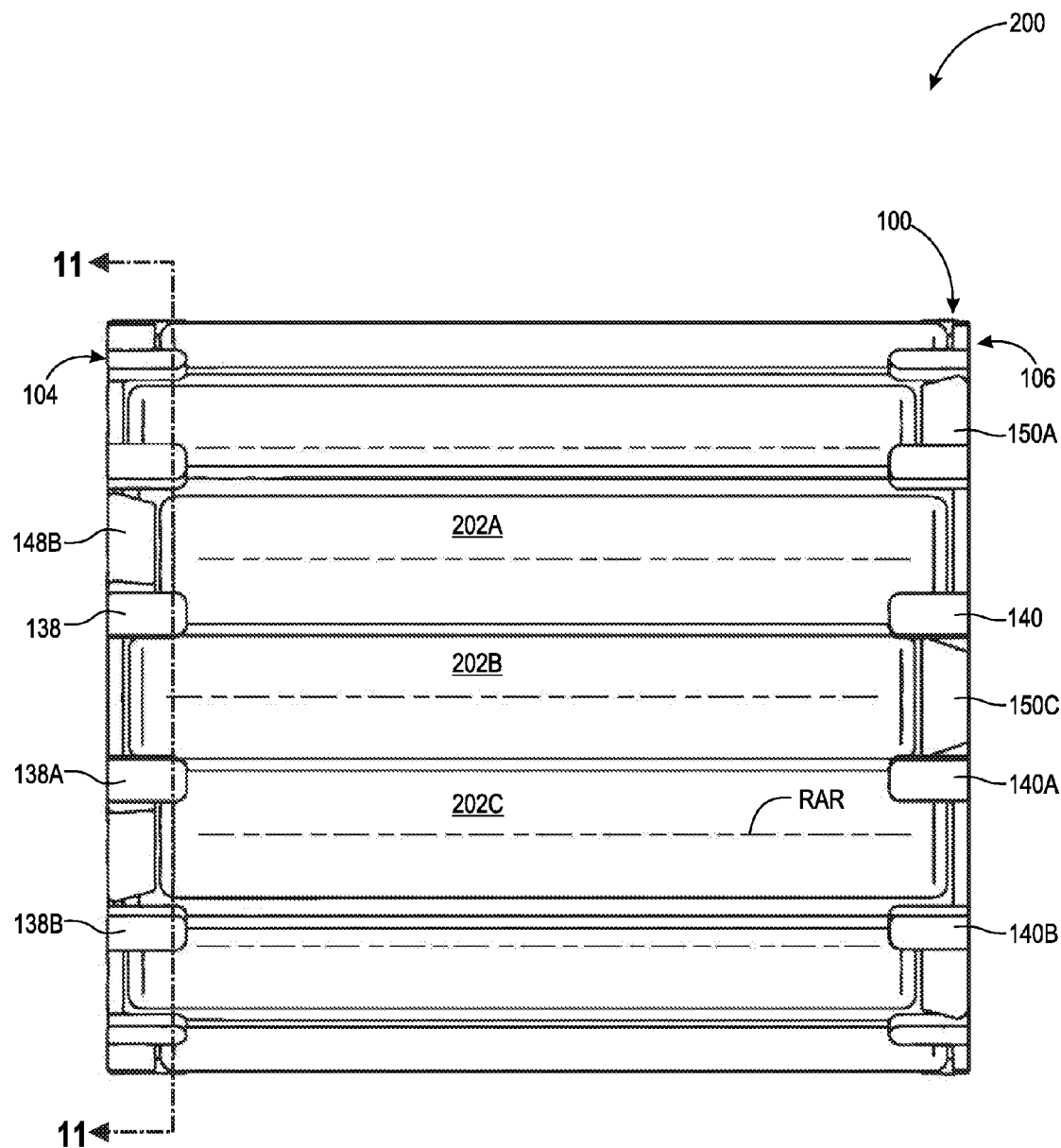
FIG. 10 is a side view of a roller bearing assembly including a roller bearing cage with bars having a circumferential extent less than a radial extent.
Figure 11:
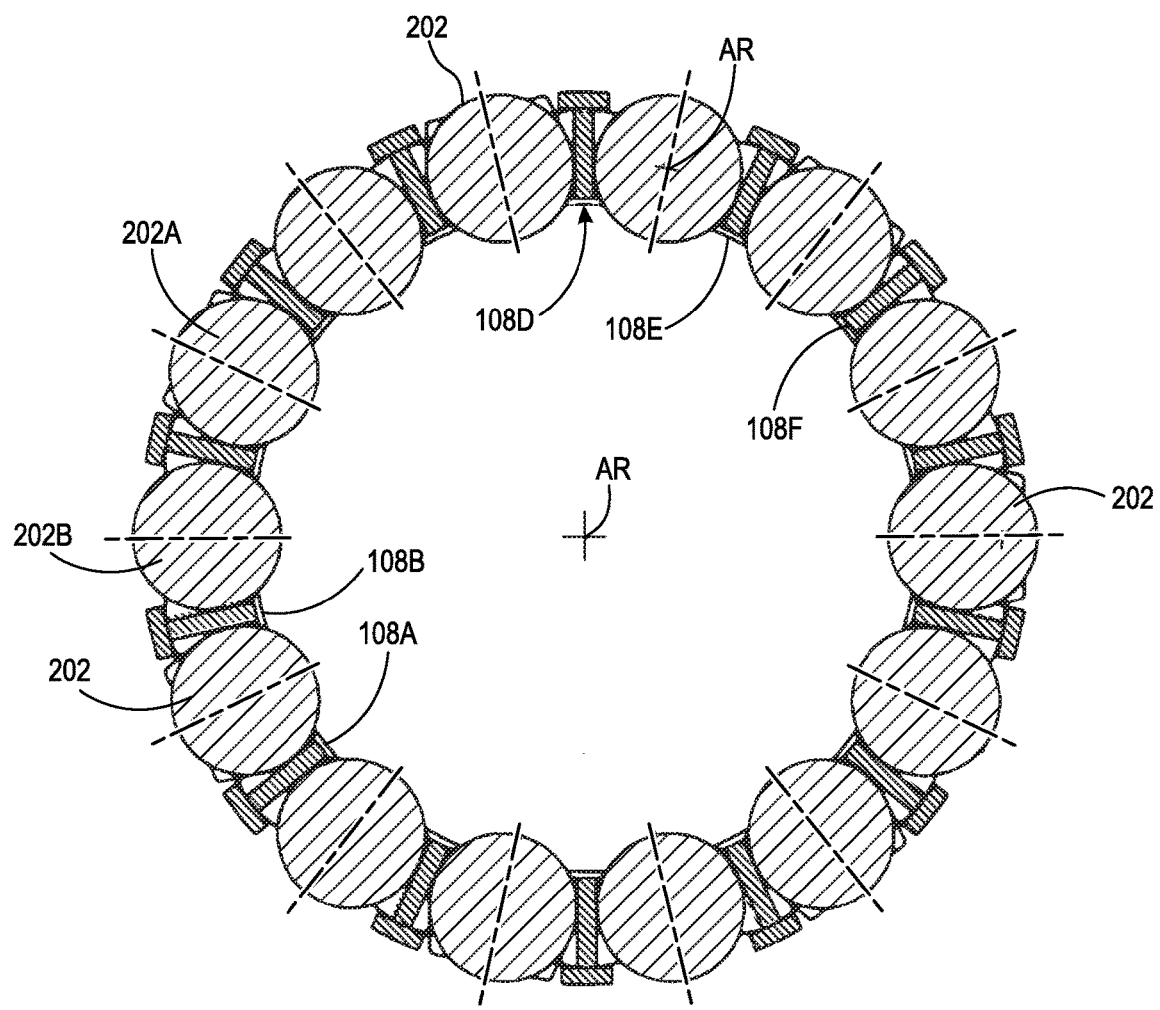
FIG. 11 is a cross-sectional view generally along line 11-11 in FIG. 10.

FIG. 5 is a cross-sectional view generally along line 5-5 in FIG. 2. The following should be viewed in light of FIGS. 2 through 5. In the descriptions that follow, the nomenclature "XXXZ" is used for certain elements. "XXX" is a number referring to each element in a plurality of elements and "Z" is a letter referring to a particular element in the plurality of elements. Each bar 108 has width 114, in circumferential direction CD1, less than height 112. Cage 100 includes spaces 116. Each space 116 is circumferentially disposed between a respective pair of circumferentially adjacent bars 108 and is arranged to receive a respective roller (rollers are shown in FIGS. 10 and 11). For example, space 116A is between circumferentially adjacent bars 108A and 108B. In an example embodiment, height 112 is at least 1.5 times greater than width 114.

Each bar 108 includes opposite axial ends 118 and 120. For example, ends 118 are a furthest extent of bars 108 in axial direction AD2, opposite direction AD1, and end 120 are a furthest extent of bars 108 in axial direction AD1. Body 102 includes end panels 122. Each end panel 122 is directly connected to axial ends 118 for a respective pair of circumferentially adjacent bars; or is directly connected to axial ends 120 for a respective pair of circumferentially adjacent bar 108. For example, end panel 122A is directly connected to ends 118 of bars 108C and 108D, and end panel 122B is directly connected to ends 120 of bars 108D and 108E. Body 102 is a single piece of material.

In an example embodiment, each end panel 122 has height 112 in radial direction RD, and dimension 124, in axial direction AD1, equal width 114. Each bar 108 is directly connected to only one end panel 122 at axial end 118 and each bar 108 is directly connected to only one end panel 122 at axial end 120. For example, end 118 for bar 108D is directly connected to only end panel 122A and end 120 for bar 108D is directly connected to only end panel 122B.

Each bar 108 has sides 126 and 128, facing in circumferential directions CD1 and CD2, respectively. Direction CD2 is opposite direction CD1. In an example embodiment, line L1, orthogonal to axis of rotation AR, passes through a bar 108, for example bar 108B, and is equidistant from sides 126 and 128 for the bar 108. Line L1 can be drawn through any bar 108 to be equidistant from sides 126 and 128 for the bar 108 chosen.

Figure 6:
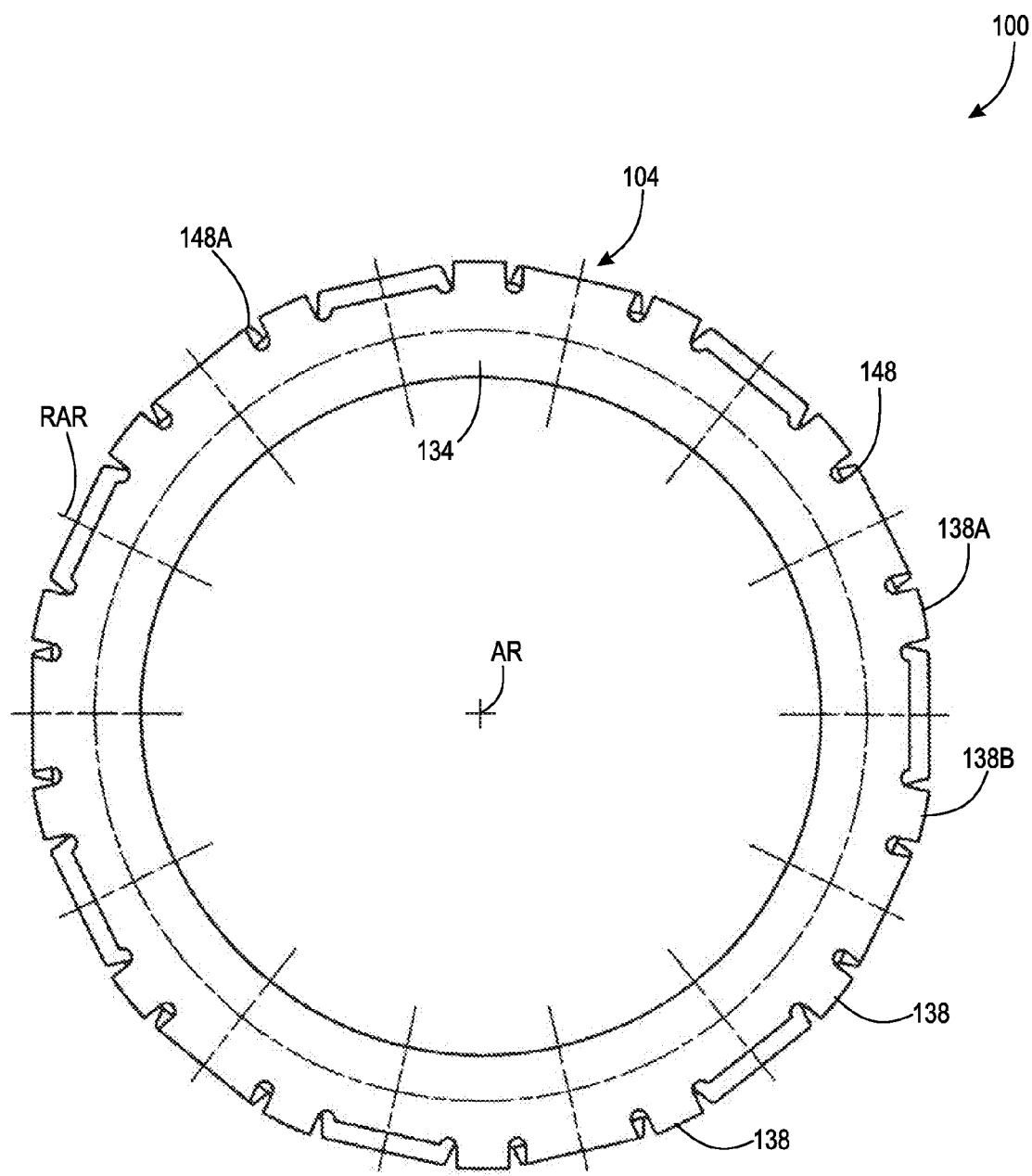
FIG. 6 is a front view of the roller bearing cage in FIG. 2.

FIG. 6 is a front view of roller bearing cage 100 in FIG. 2.

Figure 7:
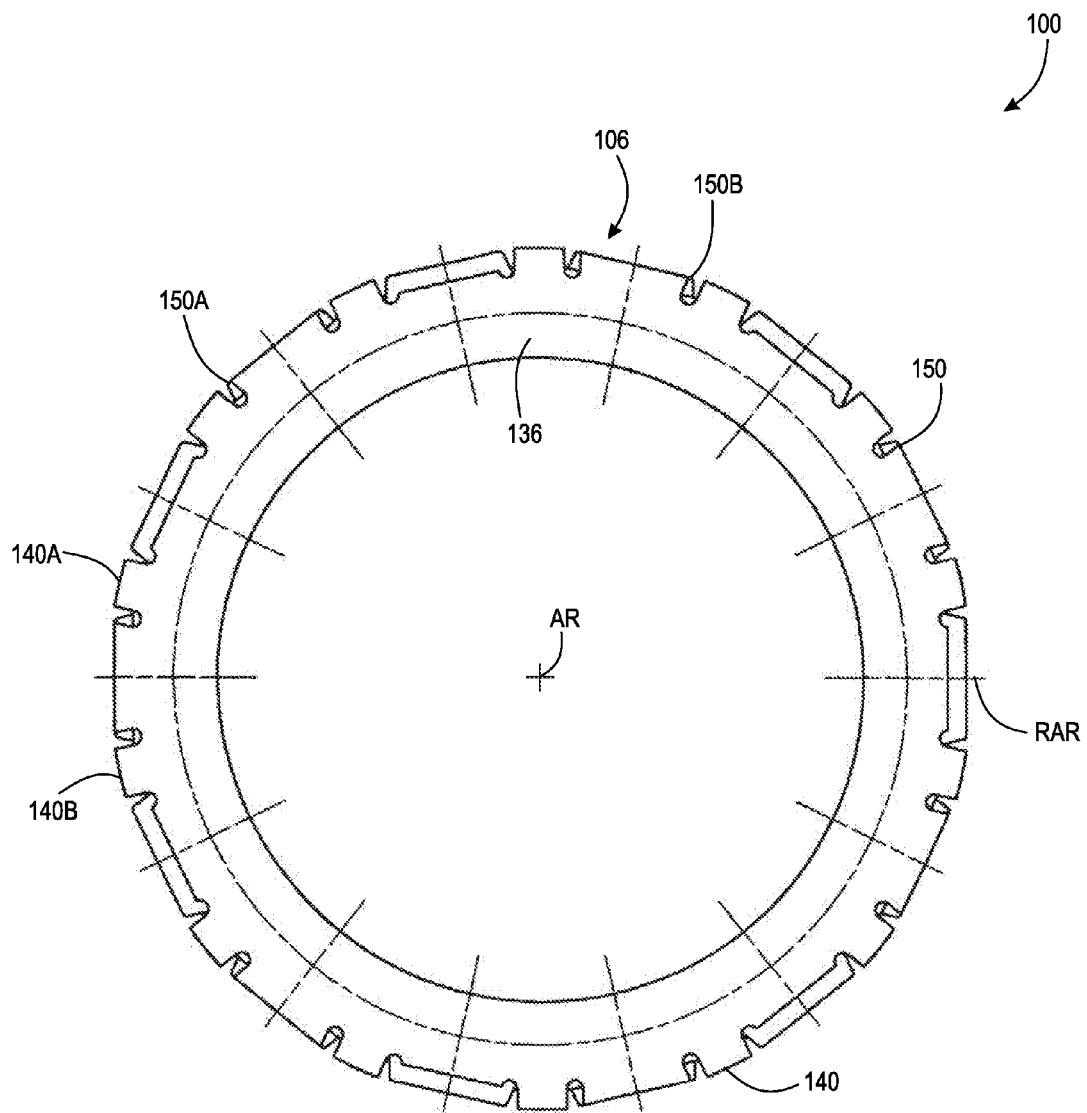
FIG. 7 is a back view of the roller bearing cage in FIG. 2.

FIG. 7 is a back view of roller bearing cage 100 in FIG. 2. The following should be viewed in light of FIGS. 2 through 7. Body 102 includes axial ends 130 and 132. Ends 130 and 132 are the portions of body 102 furthest in directions AD2 and AD1, respectively. End plates 104 and 106 are fixedly secured to ends 130 and 132, respectively. End plates 104 and 106 have ring-shaped bodies 134 and 136, respectively. In an example embodiment, bodies 134 and 136 are perpendicular to axis AR.

End plate 104 includes retention tabs 138 extending from body 134 in direction AD1. End plate 106 includes retention tabs 140 extending from body 136 in direction AD2. Tabs 138 and 140 are radially outward of bars 108 and overlap bars 108 in radial direction RD. As further described below, tabs 138 and 140 radially restrain and retain rollers in spaces 116.

To illustrate the configuration of body 102, end plates 104 and 106, and tabs 138 and 140, a series of lines are used. Line L2, parallel to axis of rotation AR, passes through a retention tab 138 and a retention tab 140, for example, tabs 138A and 140A. The retention tabs 138 and 140 through which line L2 passes are separated by distance 142 in the axial direction AD1. Line L1, orthogonal to axis of rotation AR, passes from axis of rotation AR, through a bar, for example bar 108B, to a tab 138, for example, tab 138A. Line L3, orthogonal to axis of rotation AR, passes from axis of rotation AR, through a bar, for example bar 108B, to a tab 140, for example, tab 140A.

Each retention tab 138 and each tab 140 overlaps a respective bar 108 in circumferential direction CD1. For example, tab 138A extends past bar 108B in directions CD1 and CD2 and tab 140A extends past bar 108B in directions CD1 and CD2. Circumferentially adjacent tabs 138 are separated from each other, in direction CD1, by space 144 and circumferentially adjacent tabs 140 are separated from each other, in direction CD1, by space 146.

Figure 8:
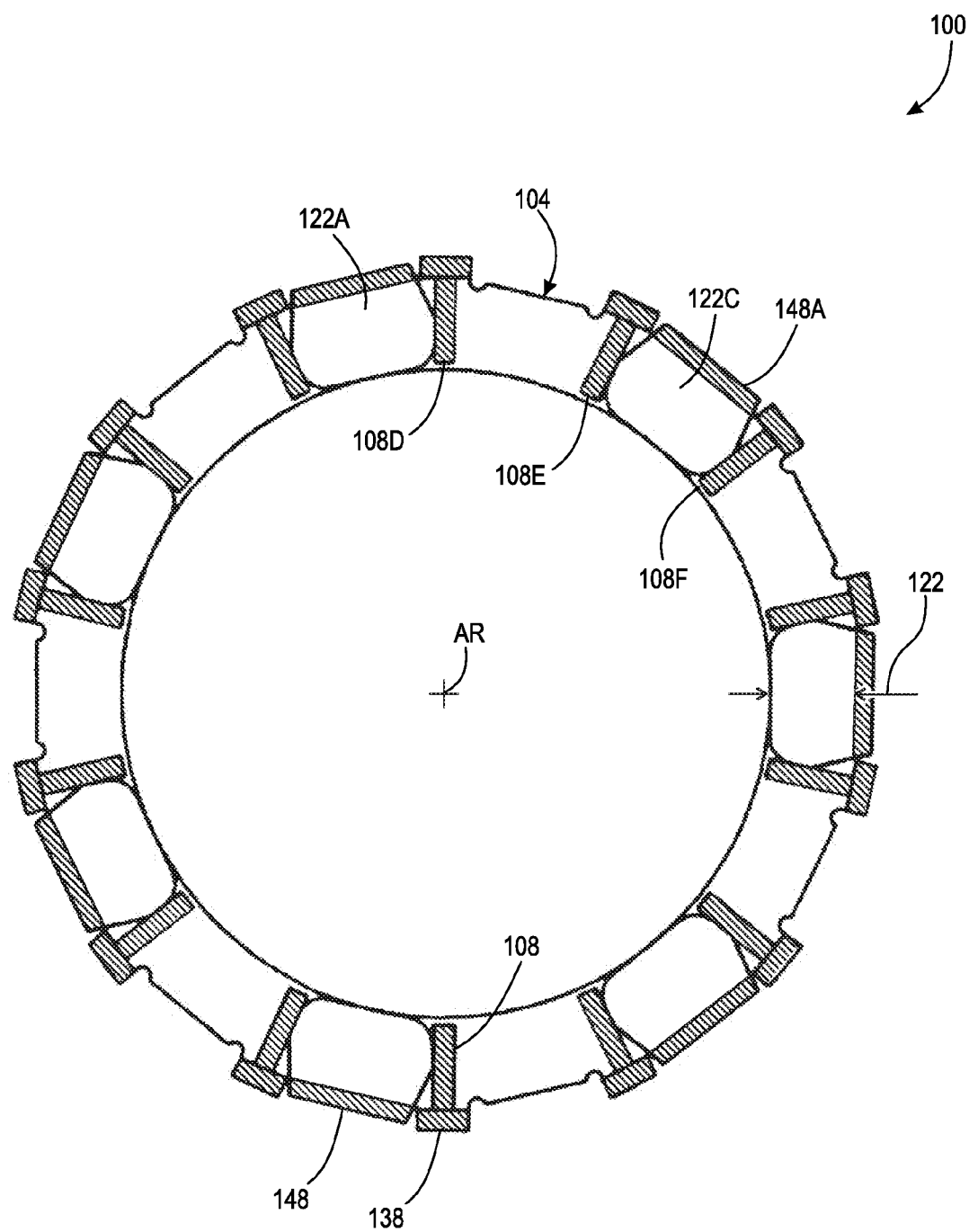
FIG. 8 is a cross-sectional view generally along line 8-8 in FIG. 2.

FIG. 8 is a cross-sectional view generally along line 8-8 in FIG. 2.

Figure 9:
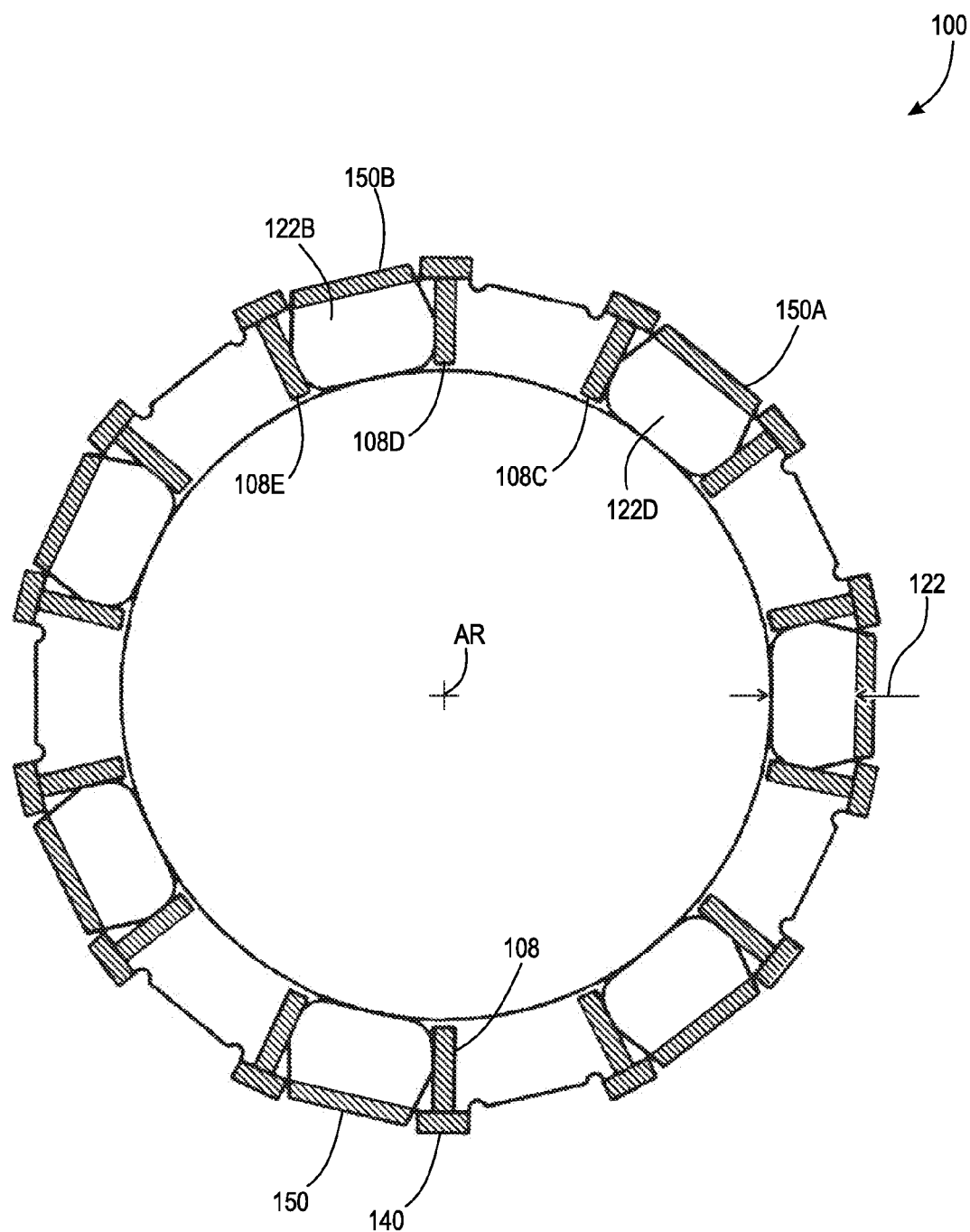
FIG. 9 is a cross-sectional view generally along line 9-9 in FIG. 2.

FIG. 9 is a cross-sectional view generally along line 9-9 in FIG. 2. The following should be viewed in light of FIGS. 2 through 9. In an example embodiment, end plates 104 and 106 include pocket tabs 148 and 150, respectively. Each pocket tab 148 is in contact with circumferentially adjacent bars 108 and a respective end panel 122 connecting the circumferentially adjacent bars. For example, tab 148A is in contact with end panel 122C and tab 150A is in contact with end panel 122D. Tabs 148 and 150 are circumferentially off-set. Therefore, a line, parallel to axis of rotation AR, passes through a pocket tab 148 without passing through a pocket tab 150 or passes through a pocket tab 150 without passing through a pocket tab 148. For example, line L4 passes through tab 150A without passing through a tab 148.

FIG. 11 is a cross-sectional view generally along line 11-11 in FIG. 10. The following should be viewed in light of FIGS. 2 through 11. Roller bearing assembly 200 includes cage 100 and rollers 202. Each roller 202 has axis of rotation RAR. Each roller 202 is disposed, in circumferential direction CD1, between a respective pair of bars 108. An axis of rotation RAR for a roller 202, passes through only one single end panel. For example: axis RAR for roller 202A passes through only end panel 122E and pocket tab 148B. Circumferentially adjacent rollers 202 are off-set, in axial direction AD1 from each other. For example, roller 202A extends further in axial direction AD1 than roller 202B, and roller 202B extends further in direction AD2 than roller 202A. For example, pocket tab 148B displaces roller 202A in direction AD1, and pocket tab 150C displaces roller 202 in direction AD2.

Cage 100 includes circumferential space 158 between circumferentially adjacent end panels. For example, space 158A is between end panels 122A and 122E and space 158B is between end panels 122F and 122G. End plate 104 blocks, in axial direction AD1 or AD2, spaces 158 at axial end 130 of body 102. End plate 106 blocks, in axial direction AD1 or AD2, spaces at axial end 132 of body 102. Thus, end plates 104 and 106, in conjunction with end panels 122, define an axial extent of spaces 116.

FIG. 10 is a side view of a roller bearing assembly 200 including roller bearing cage 100 with bars having a circumferential extent less than a radial extent.

FIG. 11 is a cross-sectional view generally along line 11-11 in FIG. 10. The following should be viewed in light of FIGS. 2 through 11. Roller bearing assembly 200 includes cage 100 and rollers 202. Each roller 202 has axis of rotation RAR. Each roller 202 is disposed, in circumferential direction CD1, between a respective pair of bars 108. An axis of rotation RAR for a roller 202, passes through only one single end panel. For example: axis RAR for roller 202A passes through only end panel 122E and pocket tab 148B; and axis RAR for roller 202D passes through only end panel 12211 and pocket tab 150C. Circumferentially adjacent rollers 202 are off-set, in axial direction AD1 from each other. For example, roller 202A extends further in axial direction AD1 than roller 202B, and roller 202B extends further in direction AD2 than roller 202A. For example, pocket tab 148B displaces roller 202A in direction AD1, and pocket tab 150C displaces roller 202B in direction AD2.

Each roller 202 is axially located between: end plate 104 (blocking a respective space 158 at axial end 130) and a respective end panel 122; or between end plate 106 (blocking a respective space 158 at axial end 132) and a respective end panel 122. For example: roller 202A is between end plate 106, and end panel 122E and pocket tab 148B; and roller 202B is between end plate 104, and end panel 12211 and pocket tab 150C.

Retention tabs 138 and 140 overlap rollers 202 in radial direction RD to restrain movement of rollers 202 radially outward and to retain rollers 202 in desired radial positions. For example, tabs 138A and 138B and tabs 140A and 140B restrain and retain roller 202C.

Figure 12:
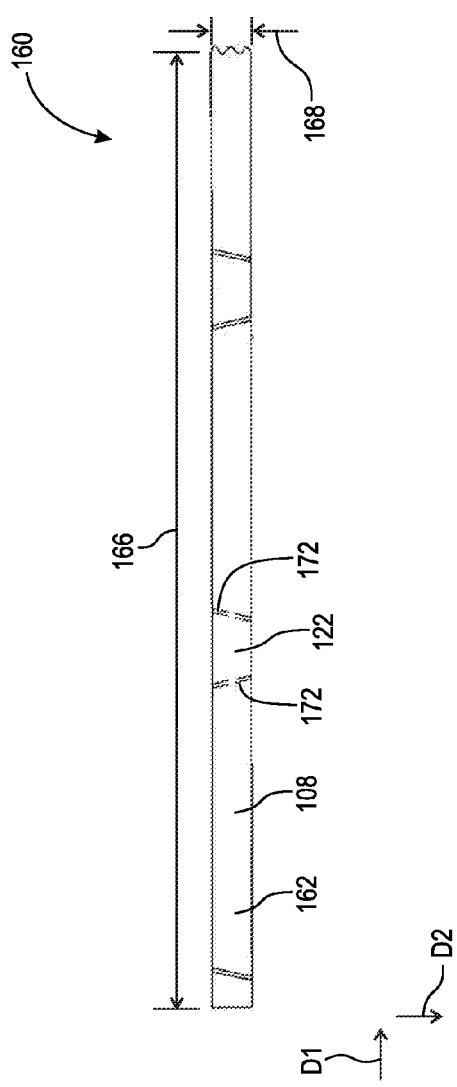
FIG. 12 is a plan view of a strip of metal for use in fabricating a roller bearing cage.

FIG. 12 is a plan view of a strip of metal for use in fabricating a roller bearing cage.

Figure 13:
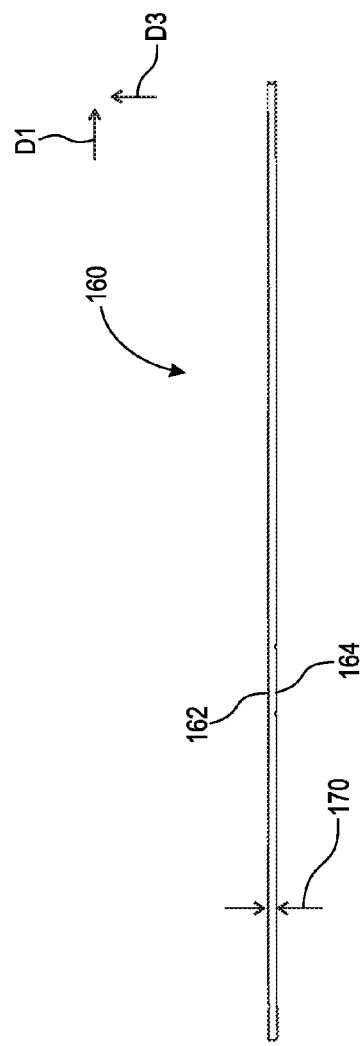
FIG. 13 is a side view of the strip of metal in FIG. 12.

FIG. 13 is a side view of the strip of metal in FIG. 12.

Figure 14:
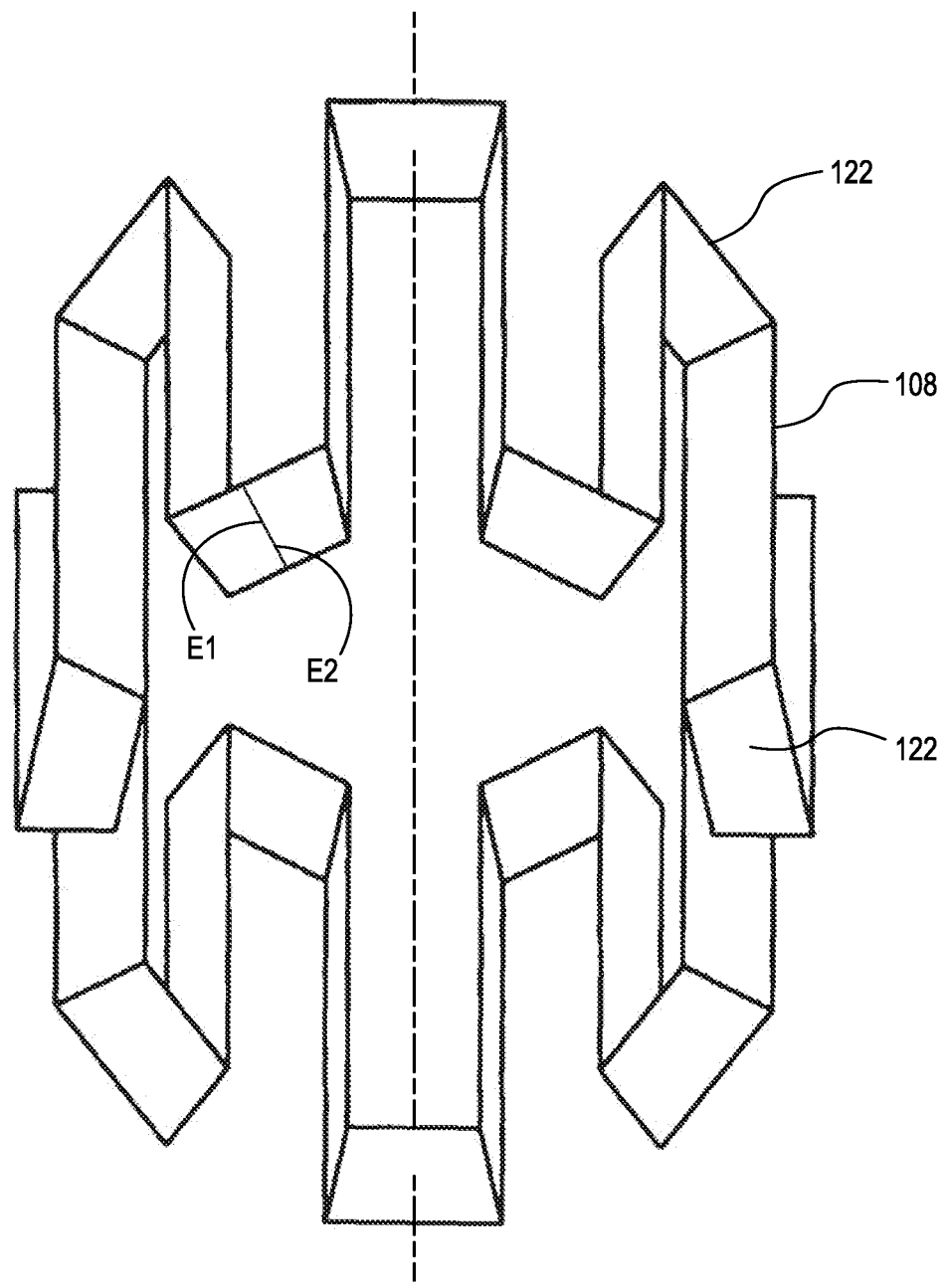
FIG. 14 is a perspective view of the strip of metal in FIG. 13 after initial bending.

FIG. 14 is a perspective view of the strip of metal in FIG. 13 after initial bending. The following should be viewed in light of FIGS. 2 through 9 and 12 through 14. The following describes a method of fabricating a roller bearing cage. Although the method is presented as a sequence of steps for clarity, no order should be inferred from the sequence unless explicitly stated. A first step bends strip of metal 160 to form bars 108 and end panels 122. Strip 160 has: oppositely facing sides 162 and 164. Side 162 includes length 166 in direction D1 and width 168, less than length 166, in a direction D2 orthogonal to direction D1. Strip 160 has thickness 170, less than width 168, in direction D3, orthogonal to directions D1 and D2, between sides 162 and 164. In an example embodiment, prior to the first step, bend grooves 172 are formed in strip 160 in the areas at which strip 160 is bent to form bars 108 and end panels 122. A second step forms the strip of metal about axis of rotation AR and connects ends E1 and E2 of strip 160.

Figure 15:
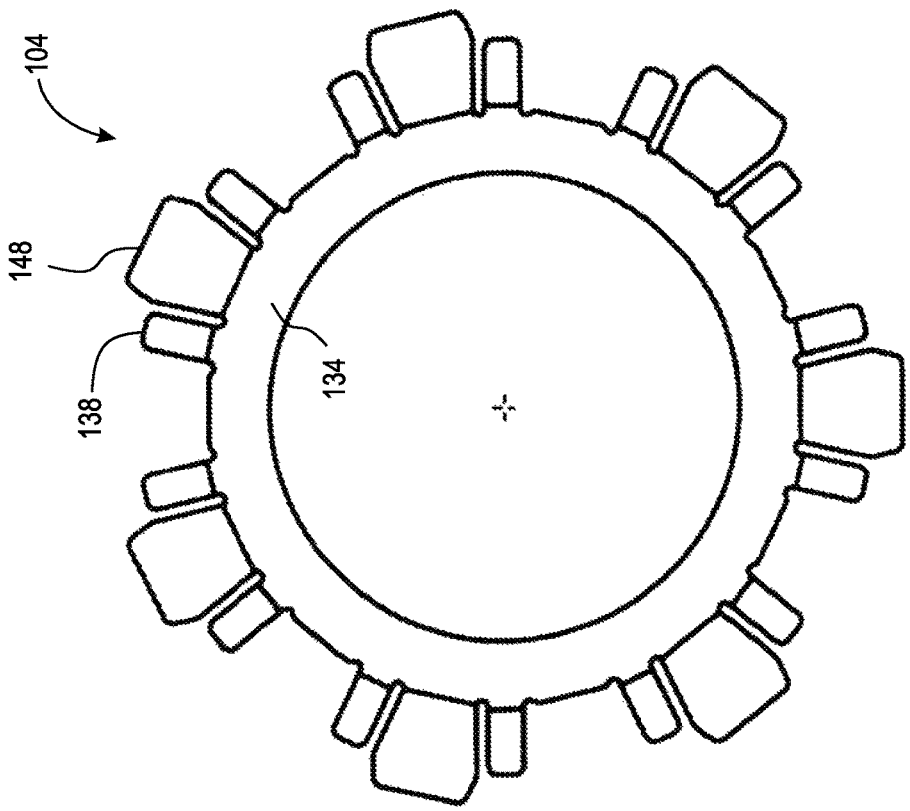
FIG. 15 is a side view of an end plate for a roller bearing cage.

FIG. 15 is a side view of an end plate for a roller bearing cage.

Figure 16:
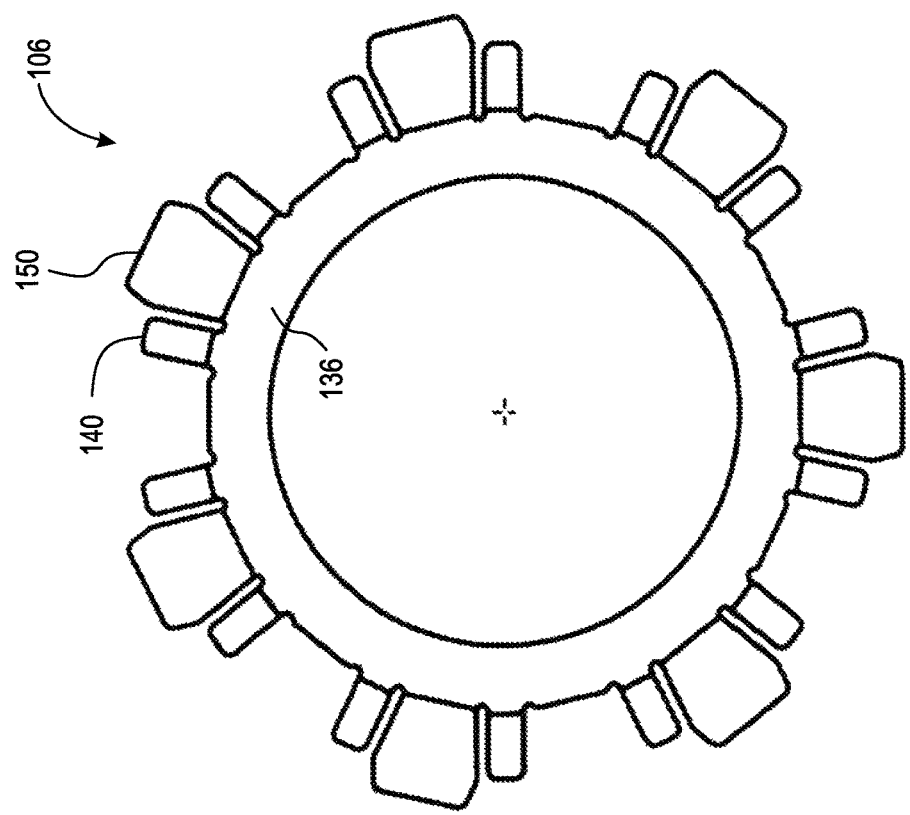
FIG. 16 is a side view of an end plate for a roller bearing cage.

FIG. 16 is a side view of an end plate for a roller bearing cage.

Figure 17:
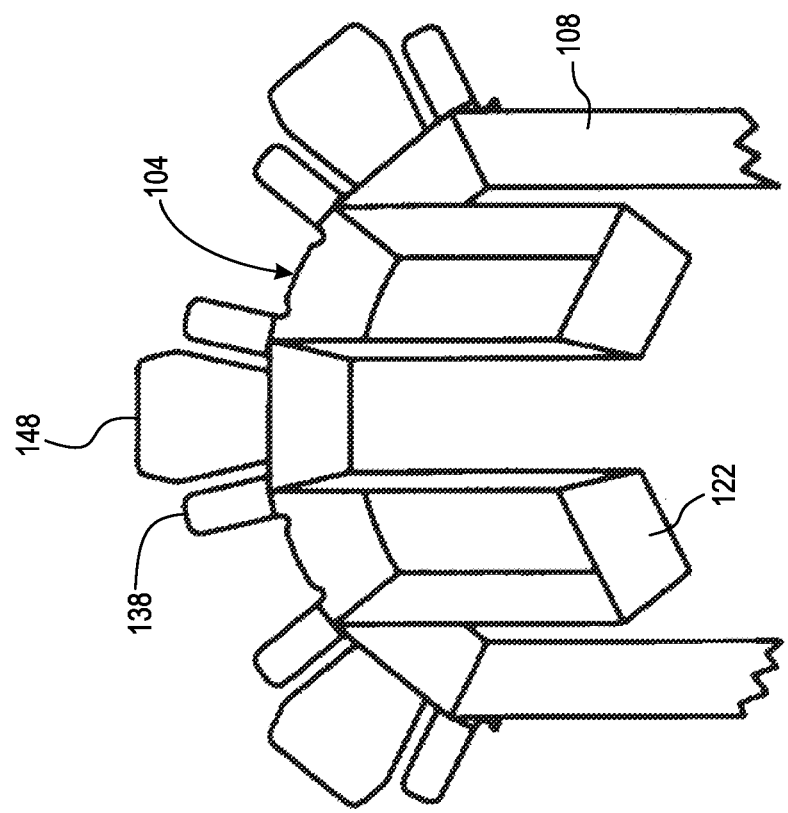
FIG. 17 shows the end plate of FIG. 15 in contact with the bars and the first plurality of end panels.
Figure 19:
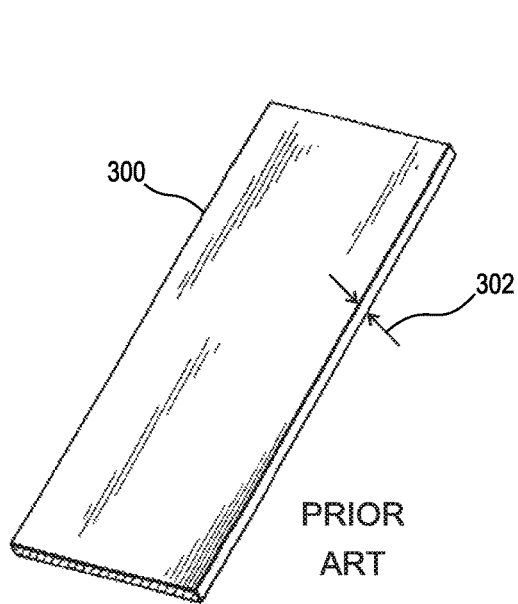
FIG. 19 is a perspective view of a flat steel strip in an initial stage for a prior art roller bearing cage.
Figure 20:
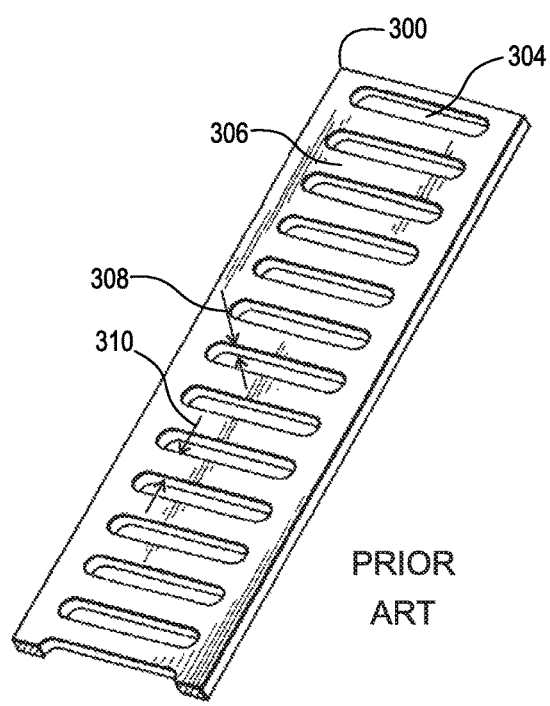
FIG. 20 is a perspective view of the strip in FIG. 19 after slots have been punched out to form pockets; and, FIG. 21 is a perspective view of a prior art roller bearing cage formed from the steel strip shown in FIGS. 12 and 13.
Figure 21:
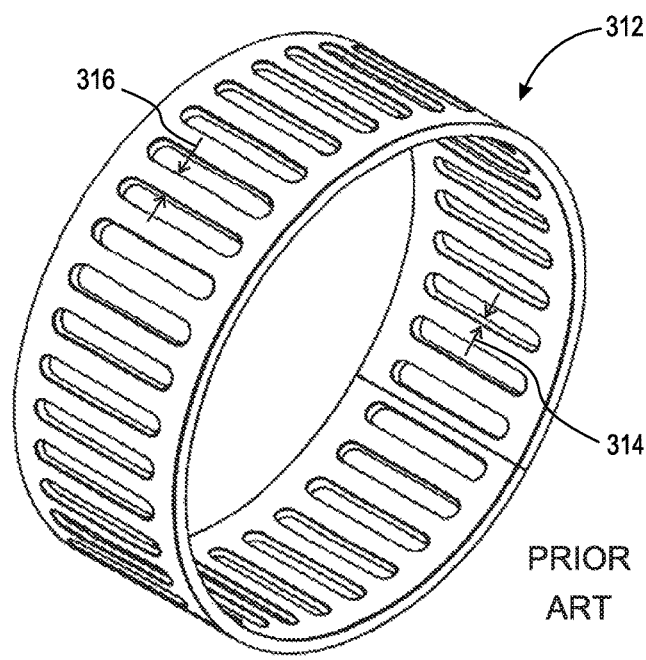

FIG. 17 shows the end plate of FIG. 15 in contact with the bars and the first plurality of end panels.

Figure 18:
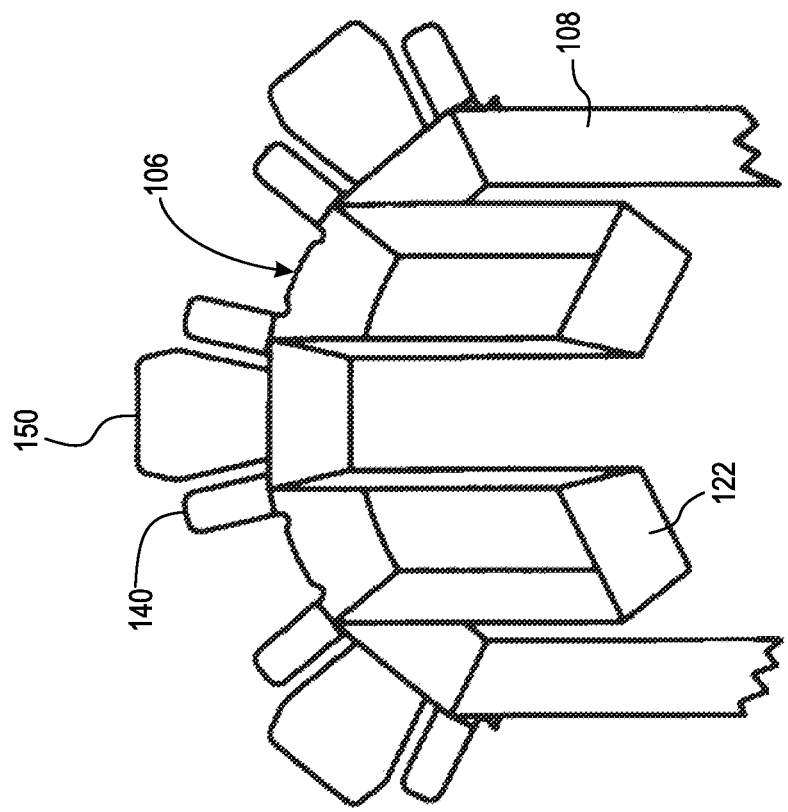
FIG. 18 shows the end plate of FIG. 16 in contact with the bars and the second plurality of end panels.

FIG. 18 shows the end plate of FIG. 16 in contact with the bars and the second plurality of end panels. The following should be viewed in light of FIGS. 2 through 9 and 12 through 18. A third step forms end plate 104 having retention tabs 138 and pocket tabs 148. A fourth step forms end plate 106 having retention tabs 140 and pocket tabs 150. A fifth step fixedly secures end plate 104 to a first group of end panels 122 (at end 130), such that axis AR passes through end plate 104. A sixth step fixedly secures end plate 106 to a second group of end panels 122 (at end 132) such that bars 108 are disposed parallel to the axis of rotation AR and between end plates 104 and 106. FIGS. 17 and 18 show end panels 104 and 106, respectively, in position to be fixed to bars 108 and end panels 122. A seventh step form spaces 116. Spaces 116: are bounded in axial direction AD2 by end panel 104, are bounded in axial direction AD1, by the first group of end panels 122, and are bounded in circumferential directions CD1 and CD1 by bars 108; or, are bounded in axial direction AD1 by the second group of end panels 122, are bounded in axial direction AD2 by end panel 106, and are bounded in circumferential directions CD1 and CD2 by the plurality of bars.

An eight step positions bars 108 such that each bar 108: has dimension 114, in circumferential direction CD1, equal to thickness 210 of strip of metal 200; and has dimension 112, in radial direction RD, equal to width 208 of strip of metal 200.

The fifth step includes bending pocket tabs 148 over the first group of end panels 122. The sixth step includes bending pocket tabs 150 over the second group of end panels 108. FIGS. 17 and 4 show tabs 148 before and after bending. FIGS. 18 and 5 show tabs 150 before and after bending. A ninth step bends tabs 138 at a right angle to end plate 104. A tenth step bends tabs 140 at a right angle to end plate 106.

An eleventh step contacts each bar 108 included in the plurality of bars with a respective pocket tab 148 and with a respective pocket tab 150. A twelfth step fixes, with the respective pocket tabs 148 and 150, an orientation for each bar 108 with respect to a respective line orthogonal to axis of rotation AR. A thirteenth step fixes, with the respective pocket tabs 148 and 150, dimension 156, in circumferential direction CD1, for each space 116. A fourteenth step grinds outer diameter 156 of cage 100. Note that after grinding tabs 138 and 140 provide the guiding surfaces for cage 100.

As noted above, known roller bearing cages have bars between rollers have a circumferential extent greater than a radial extent. This configuration limits the number of roller spaces that can be formed in the cages. Also, as noted above, it is not possible to successfully increase the number of rollers in a bearing cage using known production methods. For example, reducing the circumferential extent of the bars to accommodate more rollers drastically reduces cage robustness, which typically leads to premature failure.

Advantageously, cage 100 and the method of fabricating cage 100 provide a solution that increases the number of rollers in a given size of bearing cage without reducing the robustness and durability of the roller cage. Specifically: bars 108 have a reduced circumferential dimension 114, equal to a thickness of a strip of metal used to fabricate cage 100, which creates room for additional rollers; and bars 108 have a radial dimension 112, equal to a width of the strip of metal, which provides the desired robustness and durability. For example, a prior art roller bearing cage with particular outer dimensions accommodates 11 rollers. Cage 100 with the same outer dimensions accommodates 14 rollers. The configuration of cage 100 results in a greater than 20% increase in load bearing capacity for a prior art cage having the same outer dimensions. Further, the axial off-set of rollers 202 spread load distribution over a larger area, reducing stress. In addition, the axial off-set reduces possible gear bore tilt.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A roller bearing cage, comprising:
    an axis of rotation;
    a body including a plurality of bars, each bar having:
        a length, in a first axial direction parallel to the axis of rotation;
        a height, in a radial direction orthogonal to the axis of rotation, less than the length; and,
        a width, in a circumferential direction, less than the height; and,
    a plurality of spaces, each space:
        circumferentially disposed between a respective pair of circumferentially adjacent bars; and,
        arranged to receive a respective roller, wherein the body includes a first axial end and a second axial end, the roller bearing cage further comprising:
        a first end plate fixedly secured to the first axial end and including:
            a ring-shaped body; and,
            a plurality of retention tabs extending in the first axial direction from the ring-shaped body; and,
        a second end plate fixedly secured to the second axial end and including:
            a ring-shaped body; and,
            a plurality of retention tabs extending in the second axial direction from the ring-shaped body of the second end plate.

2. The roller bearing cage of claim 1, wherein the height is at least 1.5 times greater than the width.

3. The roller bearing cage of claim 1, wherein:
said each bar includes a first axial end and a second opposite axial end;
the body includes a plurality of end panels, each end panel directly connected to:
  the first axial ends for a respective pair of circumferentially adjacent bars; or,
  the second axial ends for a respective pair of circumferentially adjacent bars;
said each end panel has the height in the radial direction and a dimension, in the first axial direction, equal to the width; and,
the first axial end of said each bar is directly connected to only one end panel.

4. The roller bearing cage of claim 1, wherein:
a first bar has a first side and a second side facing in a first circumferential direction and in a second circumferential direction, respectively; and,
a line orthogonal to the axis of rotation passes through the first bar and is equidistant from the first side and the second side.

5. The roller bearing cage of claim 1, wherein:
a line parallel to the axis of rotation passes through a retention tab for the first end plate and a retention tab for the second end plate; and,
the retention tab for the first end plate and the retention tab for the second end plate are separated by a distance in the first axial direction.

6. The roller bearing cage of claim 1, wherein:
a first line orthogonal to the axis of rotation passes from the axis of rotation through a first bar to a retention tab for the first end plate;
a second line orthogonal to the axis of rotation passes from the axis of rotation through a second bar to a retention tab for the second end plate; and,
each retention tab for the first axial end plate or for the second axial end plate overlaps a respective bar in the circumferential direction.

7. The roller bearing cage of claim 1, wherein circumferentially adjacent retention tabs for the first end plate are separated from each other, in the circumferential direction, by a space.

8. The roller bearing cage of claim 1, wherein:
the first end plate is fixedly secured to a first axial end of the body and includes a plurality of pocket tabs;
the second end plate is fixedly secured to a second axial end of the body and includes a plurality of pocket tabs; and,
a pocket tab for the first end plate is in contact with:
  first and second circumferentially adjacent bars; and,
  an end panel connecting the first and second circumferentially adjacent bars.

9. The roller bearing cage of claim 8, wherein a line, parallel to the axis of rotation, passes through a pocket tab for the first end plate without passing through a pocket tab for the second end plate.

10. A roller bearing assembly, comprising:
an axis of rotation;
a cage including:
  a body including:
    a plurality of bars; and,
    a plurality of end panels, each end panel directly connected to a respective pair of bars adjacent to each other in a circumferential direction; and,
a plurality of rollers, each roller in the plurality of rollers:
  including an axis of rotation; and,
  disposed, in the circumferential direction, between a respective pair of bars,
  wherein a line, co-linear with the axis of rotation of a roller included in the plurality of rollers, passes through only one single end panel; and
  wherein:
    the body includes a first axial end and a second axial end; and,
    the cage includes:
      a first end plate fixedly secured to the first axial end and including a plurality of retention tabs overlapping the plurality of rollers in a radial direction orthogonal to the axis of rotation for the roller bearing assembly; and,
      a second end plate fixedly secured to the second axial end and including a plurality of retention tabs overlapping the plurality of rollers in the radial direction; or,
  wherein a first roller is off-set, in an axial direction, parallel to the axis of rotation for the roller bearing assembly, from a second roller; or,
  wherein:
    the cage includes a first end plate with a first plurality of pocket tabs and a second end plate with a second plurality of pocket tabs;
    each pocket tab in the first plurality of pocket tabs includes a first side and a second side in contact with a first bar and a second bar, respectively, the first bar and the second bar adjacent to each other in the circumferential direction;
    each pocket tab in the second plurality of pocket tabs includes a first side and a second side in contact with a third bar and a fourth bar, respectively, adjacent to each other in the circumferential direction; and,
    a line, co-linear with the axis of rotation for a roller, passes through a pocket tab for one of the first end plate or the second end plate without passing through a pocket tab for the other of the first end plate or the second end plate.

11. The roller bearing assembly of claim 10, wherein each bar includes:
a length in an axial direction parallel to the axis of rotation for the roller bearing assembly;
a height, less than the length, in a radial direction orthogonal to the axis of rotation for the roller bearing assembly; and,
a width, in the circumferential direction, less than the height.

12. The roller bearing assembly of claim 10, wherein the cage includes the first end plate and the second end plate, the roller bearing assembly further comprising:
a circumferential space between first and second circumferentially adjacent end panels, wherein:
  the first end plate contacts the first and second circumferentially adjacent end panels and blocks the circumferential space in an axial direction parallel to the axis or rotation for the roller bearing assembly; and,
  a roller is axially located between the first end plate and a third end panel.

13. A method of fabricating a roller bearing cage, comprising:
bending a strip of metal to form a plurality of bars and a plurality of end panels, the strip of metal having:
  first and second oppositely facing sides, each of the first and second sides including a length in a first direction and a width, less than the length, in a second direction orthogonal to the first direction; and, a thickness, less than the width, in a third direction, orthogonal to the first and second directions, between the first and second oppositely facing sides;

forming the strip of metal about an axis of rotation;

forming a first end plate having a plurality of retention tabs and a plurality of pocket tabs;

forming a second end plate having a plurality of retention tabs and a plurality of pockets tabs;

fixedly securing the first end plate to a first group of end panels included in the plurality of end panels, such that the axis of rotation passes through the first end plate;

fixedly securing the second end plate to a second group of end panels included in the plurality of end panels, such that the plurality of bars are disposed parallel to the axis of rotation and between the first and second end plates; and, forming a plurality of spaces:
bounded in a first axial direction, parallel to the axis of rotation, by the first end panel, bounded in a second axial direction, opposite the first axial direction, by the first group of end panels, and bounded in first and second opposite circumferential directions by the plurality of bars; or, bounded in a first axial direction, parallel to the axis of rotation, by the second group of end panels, bounded in a second axial direction, opposite the first axial direction, by the second end panel, and bounded in first and second opposite circumferential directions by the plurality of bars.

14. The method of claim 13, further comprising:
positioning the plurality of bars such that each bar:
has a first dimension, in the first circumferential direction, equal to the thickness of the strip of metal; and,
has a second dimension, in a radial direction orthogonal to the axis of rotation, equal to the width of the strip of metal.

15. The method of claim 13, wherein:
fixedly securing the first end plate to the first group of end panels includes bending the plurality of pocket tabs for the first end plate over the first group of end panels; and,
fixedly securing the second end plate to the second group of end panels includes bending the plurality of pocket tabs for the second end plate over the second group of end panels, the method further comprising:
bending the plurality of retention tabs for the first end plate at a right angle to the first end plate; and,
bending the plurality of retention tabs for the second end plate at a right angle to the second end plate.

16. The method of claim 13, further comprising:
contacting each bar included in the plurality of bars with a respective pocket tab for the first end plate and with a respective pocket tab for the second end plate:
fixing, with the respective pocket tab for the first end plate and with the respective pocket tab for the second end plate, an orientation of said each bar with respect to a respective line orthogonal to the axis of rotation; and,
fixing, with the respective pocket tab for the first end plate and with the respective pocket tab for the second end plate, a dimension, in the first circumferential direction, for each space included in the plurality of spaces.

* * * * *